Sept. 24, 1963
N. M. SULLIVAN
3,104,749
CONVEYOR STOP
Filed May 26, 1961
2 Sheets-Sheet 1
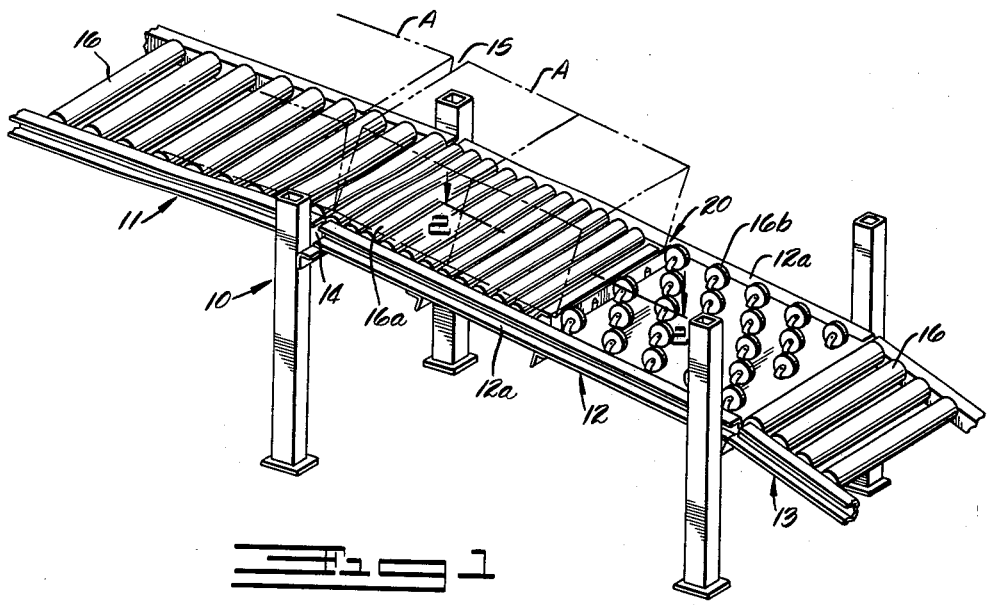
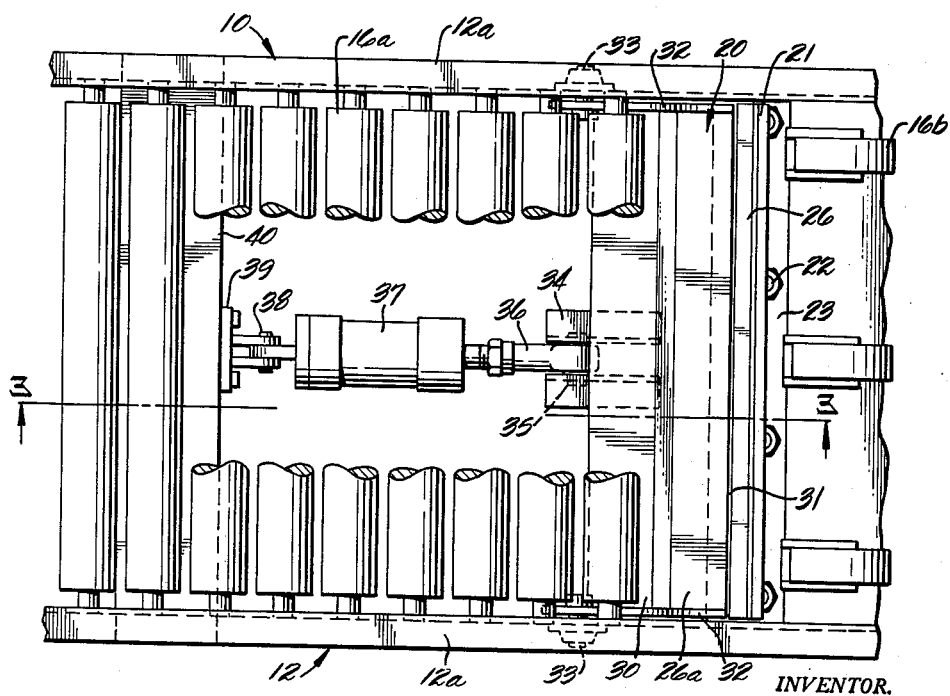
INVENTOR.
NORMAN M. SULLIVAN
BY MAHONEY, MILLER & RAMBO
BY
ATTORNEYS.

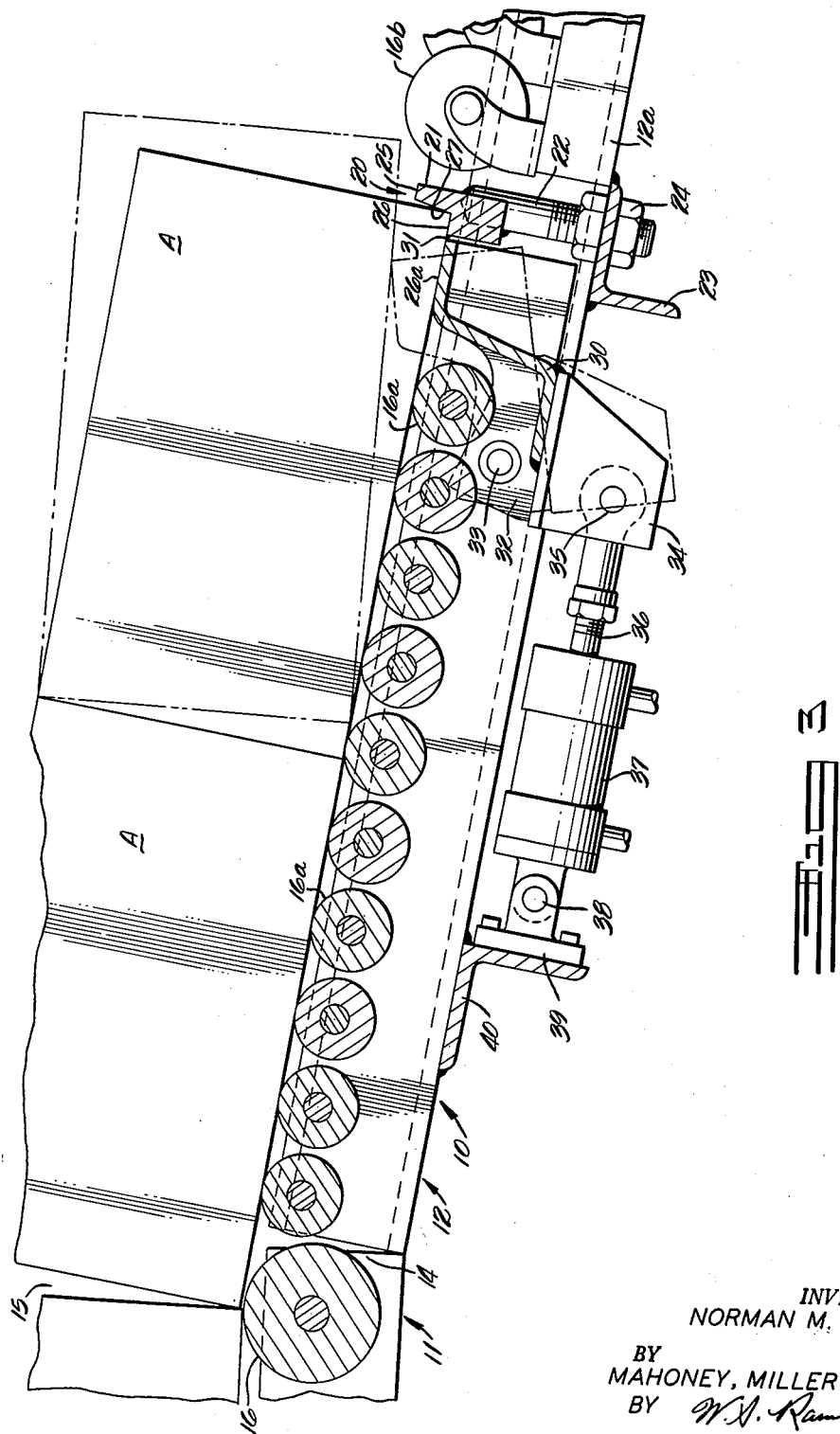

United States Patent Office 3,104,749
Patented Sept. 24, 1963

3,104,749
CONVEYOR STOP
Norman M. Sullivan, Cincinnati, Ohio, assignor to The Alvey-Ferguson Company, Cincinnati, Ohio, a corporation of Ohio
Filed May 26, 1961, Ser. No. 112,835
3 Claims. (Cl. 193—35)

This invention relates to a conveyor stop. It has to do, more particularly, with a conveyer stop arrangement in association with an inclined roller-type conveyer upon which articles are positioned for movement therealong by gravity. The conveyer stop functions to stop movement of the lowermost article of a row of articles on the conveyer until it is desired to remove the article or move it along to a new location.

Gravity feed conveyers of the general type indicated above have, in the prior art, been provided with stop arrangements which include a stop abutment for engaging and stopping the leading edge of the leading article of a row or articles supported by the conveyer. With this stop abutment, in the prior art, there is usually provided in cooperative association therewith, means for lifting the leading or lowermost article so that its leading lower corner is lifted above the abutment to permit such article to be removed from the conveyer or to move along to another location. As the lowermost article is lifted and moved over the abutment, the succeeding article of the row moves down into the position the previous article occupied in engagement with the abutment.

There have been two major faults in the conveyor stop arrangements provided heretofore which result mainly from the designs of stop abutments used in the prior art. One fault is that, due to the pressure of succeeding articles, there is excessive friction developed at the contacting surfaces of the article and stop abutment which makes it exceedingly difficult to lift the article over the abutment. The other fault is encountered mainly when the articles are cartons of cardboard or paperboard or similar material and results from the leading edge of the carton extruding or deforming down into the crack or joint between the stop abutment and the movable lifting bar associated therewith.

It is, therefore, the main object of this invention to provide in association with a gravity type conveyer, a stop arrangement for stopping the lowermost article of a row of succeeding articles on the conveyer which is of very simple design and yet is extremely effective for its intended purpose.

Another object of this invention is to provide a stop arrangement of the type indicated which is so designed and constructed that friction between the leading article and the stop abutment is reduced to a minimum to facilitate lifting of the article over the abutment, which, in fact, is designed to aid in lifting the article, and which is designed to prevent deformation of the leading edge or corner of the article so that it would tend to enter the joint behind the abutment.

Various other advantages will be apparent hereinafter.

In the accompanying drawings, a preferred embodiment of the conveyor stop arrangement according to this invention is illustrated and in these drawings:

FIGURE 1 is a perspective view of a typical gravity-type feed conveyer installation equipped with the stop arrangement of this invention.

FIGURE 2 is an enlarged plan view, partly broken away, taken substantially along line 2—2 of FIGURE 1, showing a portion of the conveyer having the stop arrangement associated therewith.

FIGURE 3 is a vertical sectional view taken substantially along line 3—3 of FIGURE 2.

With reference to the drawings, in FIGURE 1 there is illustrated a typical conveyer installation of the gravity feed roller-type with which this invention may be utilized. This conveyer installation is illustrated generally by the numeral 10 but it is to be understood that this invention is not limited to this specific type of conveyer. The conveyer is shown as comprising a delivery section 11, a stop section 12 and a discharge section 13, although the invention is not limited to this particular arrangement. All of the sections include rolling elements for supporting the articles to be conveyed and all are at an angle relative to the horizontal so that articles will move therealong by gravity. The articles are indicated diagrammatically in FIGURE 1 as being of cubical form and, for example, may be paperboard or cardboard cartons containing various commodities. Preferably, the section 12 is at a sharper angle than the section 11 to provide a hump at the junction 14 thereof in order that the upper rear corner of the lowermost article A, when in a predetermined stopped position on the stop section 12, will be spaced from the upper forward corner of the lowermost article A on the section 11. The resulting upwardly diverging space indicated at 15 is desirable to facilitate operation of the stop arrangement associated with the section 12 as will be explained in detail later. However, it is not necessary to the functioning of the stop arrangement which serves to stop the lowermost or leading article A in the position shown in FIGURE 1.

The specific forms of the conveyer sections 11, 12 and 13 with their rolling elements are not important to this invention. However, the section 11 and the section 13 are shown as including transverse supporting rollers 16 which extend the full width of the conveyer sections and which are disposed in succeeding spaced relationship therealong. The upper half of the conveyer section 12 is shown as including similar rollers 16a while its lower half is shown as comprising smaller rollers or wheels 16b which are laterally and longitudinally spaced. The stop arrangement of this invention is indicated generally by the numeral 20 and is disposed on the conveyer section 12, preferably at the position where the rollers 16a terminate and the wheels 16b start.

The stop arrangement or unit 20 is illustrated best in FIGURES 2 and 3 and includes a stop bar 21 which is disposed transversely of the conveyer section 12 and is preferably supported between the side rails 12a thereof. The bar is preferably carried by means of upstanding bolts 22 and is suitably fastened to the upper ends thereof as by welding. These bolts 22 are positioned in a transverse bar 23 for vertical adjustment, the bar being rigidly fixed, as by welding, to the rails 12a. Clamping nuts 24 are provided on each of the bolts 22 for clamping it in a predetermined adjusted position. Thus, the stop bar 21 is mounted between the rails 12a and is vertically adjustable relative thereto.

The stop bar 21 is of special novel form, as shown best in FIGURE 3. It includes an upstanding abutment flange or lip 25, and a supporting shelf surface or portion 26 which is behind the upstanding portion 25. It will be noted that the abutment portion 25 at its rear surface is angled to provide an angled abutment surface 27 which is angled upwardly and forwardly from the supporting shelf surface 26 to the top edge or lip of the bar. As will be apparent, the shelf surface 26 is in a flat plane corresponding to the top surfaces of the rollers 16a. It will also be noted that the wheels 16b are at a higher level than the rollers 16a and their upper surfaces are even at a higher level than the top edge or lip of the abutment bar 21. It has been found that it is extremely important to have the abutment or stop surface 27 at an angle from the article supporting plane of the conveyor or from the surface 26. In fact, it has been found in actual tests that angles of from 10° to 15° from a plane normal to the article supporting plane of the conveyer are most desirable. The importance of this angle will be discussed more in detail hereinafter. However, instead of the surface 27 being a plane angled surface, it could be a forwardly curved or concaved surface.

Directly behind the support surface 26 of the bar 21 is an article-engaging and lifting surface 26a. This surface 26a is shown as formed on the upper and forward portion of an article lifting bar 30 although other surfaces could be used such as the surface of a vertically movable roller. This bar 30 is so arranged that the surface 26a is located between the lowermost roller 16a and the bar 21 from which the roller 16a is spaced. It will be noted that there is a joint or crack 31 between the surfaces 26 and 26a. The bar 30 is carried by a depending pair of support arms 32 for vertical movement between the conveyer side rails 12a. Each of these arms is pivoted to an adjacent rail by a pivot 33. The bar 30 is moved vertically about the aligning transverse axes of the pivots 33 by means of rocker arms 34 rigidly secured to the bar intermediate its ends and depending therefrom. Pivoted at 35 between the depending rocker arms 34 is the forward end of a longitudinally adjustable rod 36. This rod 36 may be an extension of a piston rod of an actuating cylinder and piston unit 37. The rear end of the cylinder of this unit is pivoted at 38 to a bracket 39 suitably attached to a transverse support angle 40 that is carried by the conveyer rails 12a. Suitable means may be provided for controlling this actuating unit 37. Furthermore, other types of lifting bar actuating units may be provided.

It will be apparent that with this conveyer stop arrangement, the articles A will normally feed downwardly by gravity until the lower corner of the lowermost article engages the stop bar 21, as indicated in full lines in FIGURE 3. At this time, the forward or leading lower corner will be resting on the surface 26 and engaging the angled abutment surface 27. It will be noted that the leading lower corner will be forward of the crack or joint 31 between the supporting surfaces 26 and 26a. Therefore, because of the offsetting of this joint 31 behind the abutment surface 27, there will be no tendency for the material of the article, if flexible, for example, if it is a carton, to be extruded or deformed into this joint thereby interfering with lifting and further forward movement of the article.

If it is desired to release the lowermost article, the unit 37 is actuated which will swing the bar 30 upwardly. As the article is thereby lifted, the angled surface 27 provides relief to the front lower corner of the article as it is pushed up, pivoting about its rear corner. The front lower corner describes a forward arc which would encroach upon a vertical faced stop but with the angle abutment of this invention, there is vertically no encroachment of the arc into the abutment area. This reduces to a minimum the force required to lift the article. The lifted article, as indicated by broken lines in FIGURE 3, will then move on to the receiving wheels 16b. The angled surface 27 also develops a resultant force which tends to lift the article, this force being created by pressure of the lowermost and succeeding articles acting on the engagement of the lower leading corner with the angled surface. As previously indicated, the hump at the joint 14, providing the space 15, will facilitate upward rocking of the lowermost article about its trailing lower corner but even if this space 15 is not provided, the upwardly and forwardly inclined surface 27 will greatly facilitate the lifting and necessary rearward rocking of the lowermost article. Although it is preferred that the lifting bar 30 be moved vertically, it is possible to pull the stop bar 21 downwardly relative to the surface 26a to permit the article to move over the stop bar and in such an instance the angularity of the surface 27 and the provision of the surface 26 would still be important.

It will be apparent from the above description that this invention provides for a simple yet efficient stop bar arrangement for conveyers of the type including rolling elements along which the articles move by gravity. The stop abutment is so designed that it provides a stop surface directed forwardly and upwardly relative to the article supporting plane of the conveyer to facilitate movement of the article over the stop bar upon relative movement of the stop surface and the article in a vertical plane or substantially normal to the plane of the conveyer. Furthermore, the stop or abutment bar is so designed that the joint between the lifting bar and the abutment bar is offset rearwardly from the forwardly and upwardly directed abutment surface. This latter feature tends to prevent deformation of the leading corner of the article, when it is flexible or compressible, into such joint.

Various other advantages will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination with a conveyor for supporting a row of articles for movement in a selected plane therealong; a stop arrangement disposed in cooperative relationship with said conveyor for engaging a leading article of a row of articles on said conveyor to arrest movement thereof relative to said conveyor, said stop arrangement comprising a fixed stop bar extending transversely of said conveyor and having a generally upstanding stop abutment for engagement with an arrested article on said conveyor, said stop abutment having an article-engaging surface angled forwardly and upwardly relative to the plane of movement of articles on said conveyor whereby to minimize friction between said article-engaging surface and an article engaged therewith and to facilitate upward swinging of such article over said surface, a lifting bar extending transversely of said conveyor directly behind said stop bar and defining an open joint therebetween, said lifting bar having a surface thereon engageable with an underside of an article arrested by said stop abutment and being movable to lift such article over said stop abutment, the article-engaging surface of said stop abutment being offset forwardly of said open joint to prevent deformation of an arrested article downwardly into said joint, and means connected with said lifting bar for moving the same to an article-lifting position.

2. The combination set forth in claim 1, wherein said lifting bar is provided with a flat article-contacting surface and said stop bar is formed with a flat article-supporting surface behind and at the lower extremity of the angled article-engaging surface of said stop bar, and wherein said joint is disposed between said flat surfaces.

3. In combination with a conveyor for supporting a row of generally cubical cartons for movement in a given plane therealong; a stop arrangement disposed in cooperative relationship to said conveyor for engaging a leading carton of a row of cartons on said conveyor to arrest movement thereof relative to said conveyor, said stop arrangement comprising a fixed stop bar extending transversely of said conveyor and formed with a generally upstanding, planar carton-engaging surface angled forwardly and upwardly relative to the plane of movement of cartons on said conveyor and a flat carton-supporting surface disposed in generally parallel relation to the plane of movement of cartons on said conveyor and located rearwardly of and below the carton-engaging surface of said stop bar, the carton-supporting surface of said stop bar serving to support the lower forward corner portion of a carton engaged with the angled carton-engaging surface of said stop bar, and a carton-lifting bar extending transversely of said conveyor and having a flat carton-contacting surface disposed normally behind and in flush adjoining relationship to the carton-supporting surface of said stop bar, said carton-lifting bar being operable to lift the lower corner portion of a carton engaged with the angled carton-engaging surface of said stop bar over said carton-engaging surface to thereby permit continued movement of such carton relative to said conveyor.

References Cited in the file of this patent
UNITED STATES PATENTS

| | | |
|---|---|---|
| 2,790,527 | Griffith | Apr. 30, 1957 |
| 3,017,007 | McGrath | Jan. 16, 1962 |